(12) United States Patent
Tucker

(10) Patent No.: US 11,068,867 B1
(45) Date of Patent: Jul. 20, 2021

(54) LOCATION-AWARE, BILL-SPLITTING PAYMENT SYSTEM AND LOCATION-AWARE, BILL-SPLITTING PAYMENT PROCESSES

(71) Applicant: Ryan Crawford Tucker, Shoreline, WA (US)

(72) Inventor: Ryan Crawford Tucker, Shoreline, WA (US)

(\*) Notice: Subject to any disclaimer, the term of this patent is extended or adjusted under 35 U.S.C. 154(b) by 80 days.

(21) Appl. No.: 16/443,442

(22) Filed: Jun. 17, 2019

Related U.S. Application Data

(60) Provisional application No. 62/685,822, filed on Jun. 15, 2018.

(51) Int. Cl.
*G06Q 20/10* (2012.01)
*G06Q 50/12* (2012.01)
*G06Q 20/20* (2012.01)
*G06Q 20/32* (2012.01)

(52) U.S. Cl.
CPC ........... *G06Q 20/102* (2013.01); *G06Q 20/20* (2013.01); *G06Q 20/3224* (2013.01); *G06Q 20/3276* (2013.01); *G06Q 50/12* (2013.01)

(58) Field of Classification Search
CPC .. G06Q 20/102; G06Q 20/20; G06Q 20/3276; G06Q 50/12
See application file for complete search history.

(56) References Cited

U.S. PATENT DOCUMENTS

| 9,972,004 | B1 | 5/2018 | Donavalli et al. |
| 2013/0138518 | A1* | 5/2013 | White ................... G06Q 20/325 705/16 |
| 2014/0279098 | A1 | 9/2014 | Ham |
| 2014/0330654 | A1 | 11/2014 | Turney et al. |

\* cited by examiner

*Primary Examiner* — A. Hunter Wilder
(74) *Attorney, Agent, or Firm* — Plager Schack LLP; Mark H. Plager; Stephen Hallberg

(57) ABSTRACT

A location-aware, bill-splitting payment system and process are disclosed which reduces wait time for service customers, reduces work for service and waitstaff, and increases table turnover rate for a restaurant. The location-aware, bill-splitting payment system and process allows party members to quickly select and pay for their portion of the bill with their mobile devices while still sitting at the table, without having to wait for busy waitstaff to present the bill, or to manually process payment.

13 Claims, 10 Drawing Sheets

LOCATION-AWARE, BILL-SPLITTING PAYMENT SYSTEM AND LOCATION-AWARE, BILL-SPLITTING PAYMENT PROCESSES

BACKGROUND

This application claims benefit to U.S. Provisional Patent Application 62/685,822, entitled "LOCATION-AWARE, BILL-SPLITTING PAYMENT SYSTEM AND PROCESS," filed Jun. 15, 2018. The U.S. Provisional Patent Application 62/685,822 is incorporated herein by reference.

BACKGROUND

Embodiments of the invention described in this specification relate generally to billing systems, and more particularly, to a location-aware, bill-splitting payment system and location-aware, bill-splitting payment processes.

In a world full of digital and credit payment systems, it is still difficult to split a check, bill, or tab. Most solutions require that a party member pay for the entire bill up front, with the remaining party member's paying back their share at a later time. Trying to split a bill across large parties fairly and accurately is also difficult, time consuming, and often not allowed by the restaurant, bar, or establishment. Customers are left without a convenient way to quickly and easily pay for exactly what they ordered.

Existing conventional systems require that the entire bill be paid at once. Those that allow splitting a bill are usually limited to only split it across a few party members (e.g., up to four). Waitstaff are then left to process each payment method manually, in addition to understanding the (often complex) way people like to split their bill in custom ways.

Therefore, what is needed is a way to reduce wait time for service customers, work for service and waitstaff, and increase table turnover rate for a restaurant by allowing individual customer party members to quickly select and pay for their portion of a bill with their mobile devices while still sitting at the table, without having to wait for the bill to be presented or manually processed for payment.

BRIEF DESCRIPTION

A novel location-aware, bill-splitting payment system and novel location-aware, bill-splitting payment processes are disclosed which reduce wait time for service customers, reduces work for service and waitstaff, and increases table turnover rate for a restaurant or other establishment at which orders are taken. In some embodiments, the location-aware, bill-splitting payment system and the location-aware, bill-splitting payment processes allow multi-party members (or customers at a common table or sharing a common order ticket) to quickly select and pay for their portion of the bill with their mobile devices while still sitting at the table, or upon leaving, without having to wait for busy waitstaff to present the bill, or to manually process payment, and without having to wait for all the customers to finish and leave.

In some embodiments, the location-aware, bill-splitting payment system includes a location-aware digital device that is disposed at a specific order location, a mobile device application that runs on a mobile device of a customer at an establishment, a payment processing system that processes payments for orders, a point of sale (POS) system which receives and tracks customer orders as entered by waitstaff, and a back-end service that manages order ticket status, mobile payments and ties together the payment processing system, the POS system, and the mobile device application. In some embodiments, the location-aware digital device comprises one of an NFC tag, a QR code, and a Bluetooth device.

In some embodiments, the QR code is a continuously changing QR code which when read by a mobile device provides a pseudo-randomly generated identifier value. In some embodiments, the continuously changing QR code generates a new pseudo-randomly generated identifier value to display as for the continuously changing QR code after a refresh period elapses.

In some embodiments, the Bluetooth device comprises a Bluetooth Low Energy (BLE) device. In some embodiments, the BLE device comprises a beacon that wirelessly transmits a beacon ID via Bluetooth/BLE. In some embodiments, the order location comprises one of a table, a booth, a bar, a counter, and an order station.

In some embodiments, the location-aware, bill-splitting payment process includes a plurality of steps comprising (i) entering orders, by waitstaff, from multiple customers at a particular table into a point of sale (POS) system of an establishment, (ii) receiving new and updated customer order data at a back-end service that ties the POS system and a payment system to a mobile device application used by customers to view and pay for ticket orders, (iii) scanning a tag or code at a table by at least one customer among the multiple customers at the particular table making orders, (iv) selecting particular order items to pay for by the customer among all of the order items on the ticket for the particular table, (v) updating the customer order data of the ticket for the particular table at the back-end service, (vi) providing payment information of the paying customer to the payment system via the back-end service or directly from the paying customer (if the payment system prefers direct payment that is not transmitted by way of the back-end service), (vi) updating ticket payment status and amount due, at the back-end service, upon confirmation of customer's payment by the payment system, and (vii) transmitting, by the back-end service, the updated ticket payment status and amount due to the POS system.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
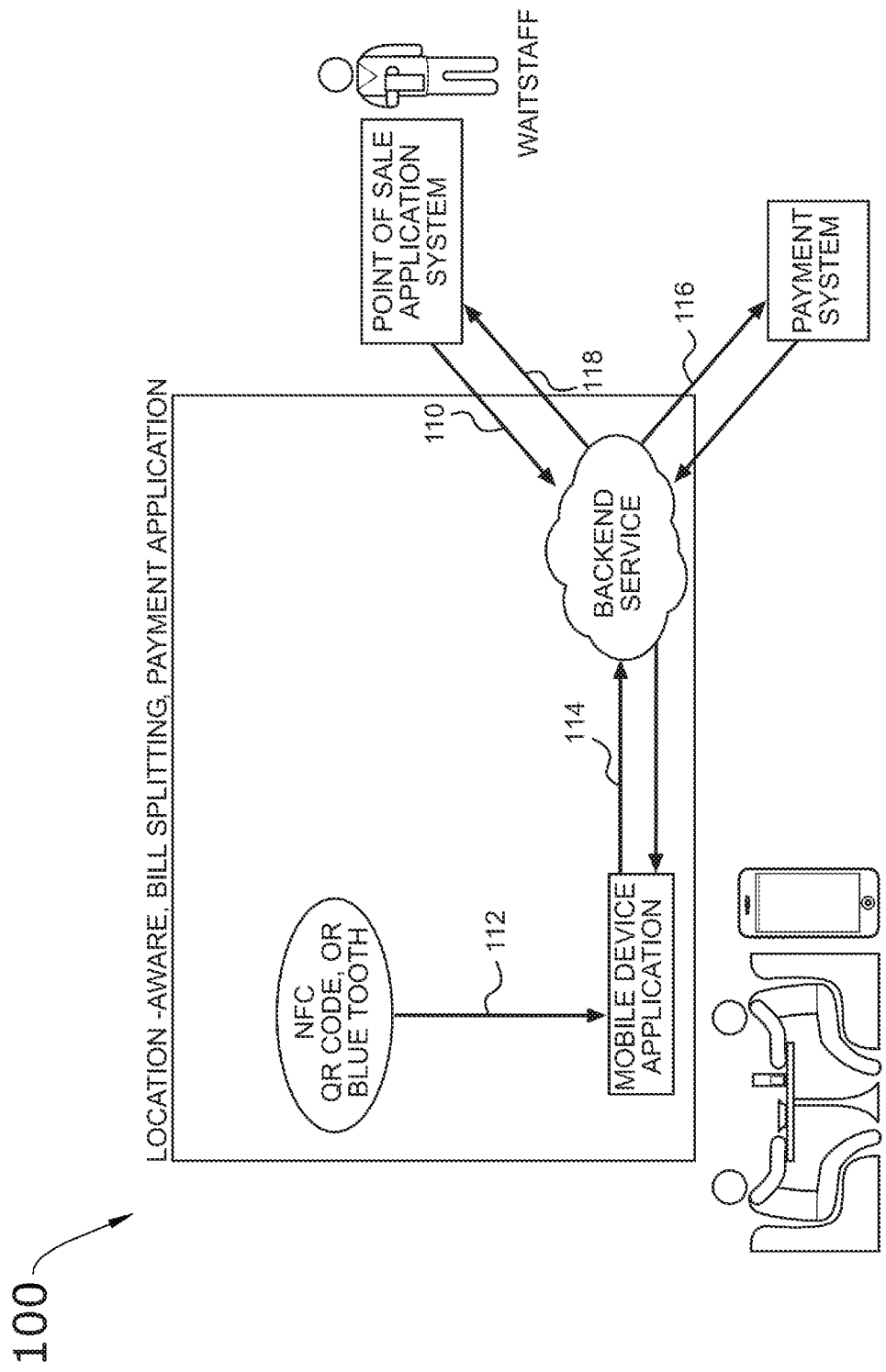
FIG. 1 conceptually illustrates a location-aware, bill-splitting payment system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel location-aware, bill-splitting payment system and a novel location-aware, bill-splitting payment process. In some embodiments, the location-aware, bill-splitting payment system and the location-aware, bill-splitting payment process allow party members (or customers at a common table or sharing a common order ticket) to quickly select and pay for their portion of the bill with their mobile devices while still sitting at the table, without having to wait for busy waitstaff to present the bill, or to manually process payment. In some embodiments, the location-aware, bill-splitting payment system and process reduces wait time for service customers, reduces work for service and waitstaff, and increases table turnover rate for a restaurant.

In some embodiments, the location-aware, bill-splitting payment system includes a location-aware digital device that is disposed at a specific order location, a mobile device application that runs on a mobile device of a customer at an establishment, a payment processing system that processes payments for orders, a point of sale (POS) system which receives and tracks customer orders as entered by waitstaff, and a back-end service that manages order ticket status, mobile payments and ties together the payment processing system, the POS system, and the mobile device application. In some embodiments, the location-aware digital device comprises one of an NFC tag, a QR code, and a Bluetooth device.

In some embodiments, the QR code is a continuously changing QR code which when read by a mobile device provides a pseudo-randomly generated identifier value. In some embodiments, the continuously changing QR code generates a new pseudo-randomly generated identifier value to display as for the continuously changing QR code after a refresh period elapses.

In some embodiments, the Bluetooth device comprises a Bluetooth Low Energy (BLE) device. In some embodiments, the BLE device comprises a beacon that wirelessly transmits a beacon ID via Bluetooth/BLE. In some embodiments, the order location comprises one of a table, a booth, a bar, a counter, and an order station.

In some embodiments, the location-aware, bill-splitting payment process includes a plurality of steps comprising (i) entering orders, by waitstaff, from multiple customers at a particular table into a point of sale (POS) system of an establishment, (ii) receiving new and updated customer order data at a back-end service that ties the POS system and a payment system to a mobile device application used by customers to view and pay for ticket orders, (iii) scanning a tag or code at a table by at least one customer among the multiple customers at the particular table making orders, (iv) selecting particular order items to pay for by the customer among all of the order items on the ticket for the particular table, (v) updating the customer order data of the ticket for the particular table at the back-end service, (vi) providing payment information of the paying customer to the payment system via the back-end service or directly from the paying customer (if the payment system prefers direct payment that is not transmitted by way of the back-end service), (vi) updating ticket payment status and amount due, at the back-end service, upon confirmation of customer's payment by the payment system, and (vii) transmitting, by the back-end service, the updated ticket payment status and amount due to the POS system.

As stated above, in a world full of digital and credit payment systems, it is still difficult to split a check, bill, or tab. Most solutions require that a party member pay for the entire bill up front, with the remaining party member's paying back their share at a later time. Trying to split a bill across large parties fairly and accurately is also difficult, time consuming, and often not allowed by the restaurant, bar, or establishment. Customers are left without a convenient way to quickly and easily pay for exactly what they ordered. Embodiments of the invention described in this specification solve such problems by allowing customers with mobile devices to leverage the capabilities of their devices to get their bill, split the bill among party members any way they choose, and then make payments directly to the establishment without having to hand their payment method to waitstaff.

The embodiments described in this specification differ from and improve upon currently existing options. In particular, current methods require that either (1) the entire payment be made at once, leaving party members to settle up later, or (2) that the burden of trying to split a tab in a custom way be left to the waitstaff (and thus is often not allowed). This system improves on this by easily letting customers split their bill any way they want, paying the establishment directly, making it easier for customers and waitstaff to settle a bill quickly.

In addition, the currently existing systems require busy waitstaff to identify that the customers are ready to pay, get the bill to the customer, and try to understand how the customer wants to split the bill. Then, the waitstaff must manually process the payment method, taking more time for each additional method preferred by the customer. In contrast, the location-aware, bill-splitting payment system and process of the present disclosure reduces wait time for the customers who have the freedom to initiate and proceed to payment and bill splitting via their own mobile devices, thereby cutting down on the work for waitstaff, increasing customer satisfaction, and freeing up tables quicker to benefit the restaurant.

The location-aware, bill-splitting payment system and process of the present disclosure may be comprised of the following elements. This list of possible constituent elements is intended to be exemplary only and it is not intended that this list be used to limit the location-aware, bill-splitting payment system and process of the present application to just these elements. Persons having ordinary skill in the art relevant to the present disclosure may understand there to be equivalent elements that may be substituted within the present disclosure without changing the essential function or operation of the location-aware, bill-splitting payment system and process.

1. NFC tag, QR code, or Bluetooth/Bluetooth Low Energy (BLE) device (such as beacon that wirelessly transmits a beacon ID via Bluetooth or BLE)
2. Mobile device application
3. Back-end service for managing mobile device application state and data
4. Payment processing system
5. Point of sale system The various elements of the location-aware, bill-splitting payment system and process of the present disclosure may be related in the following exemplary fashion. It is not intended to limit the scope or nature of the relationships between the various elements and the following examples are presented as illustrative examples only. The NFC tag, QR code, or Bluetooth device (#1) is associated with a specific table managed by the restaurant's point of sale system (#5) in the back-end service (#3). The establishment will track food and drink orders as usual using their point of sale system (#5). When they customer is ready to pay, they will pull out their mobile device and will tap the device to an NFC tag (#1) to start the mobile device application (#2). They can also start the mobile device application (#2) themselves and scan a QR code (#1) or get their mobile device near the Bluetooth device (#1). In all cases, the mobile device application (#2) will start. Since the NFC tag, QR code, and Bluetooth device (#1) are all location aware, the mobile device application (#2) will use the data about that location to talk to the back-end service (#3). The back-end service (#3) will have all of the food and drink orders entered by the waitstaff into their point of sale systems (#5).

After scanning the NFC tag or the QR code, or receiving and re-transmitting a beacon ID from a Bluetooth-type beacon, the back-end service (#3) will send the food and drink order information for that table to the mobile device application (#2). The customer will then select the items they want to pay for in the mobile device application, add a tip, enter a payment method, and confirm their payment. At this point, the mobile device application (#2) will send needed payment information to the payment processing system (#4), possibly going through the back-end system (#3), as required by the payment processing system (#4). When payment is successful, the customer will be notified on their mobile device application (#2) by the back-end service (#3), and the payment will be reflected on the establishment's point of sale system (#5).

The location-aware, bill-splitting payment system and process of the present disclosure generally works by the items noted above. In particular, the NFC tag, QR code, or Bluetooth Device includes a unique identifier that is linked to a table in the establishment's point of sale system (#5) within the back-end service (#3). The mobile device application works to recognize the identifier retrieved from the NFC tag, QR code, or Bluetooth device (#1). It uses that identifier to get information from the point of sale system (#5) via the back-end service (#3). It allows the customer to select which items they want to pay for, how they want to split the bill, and how much they want to tip. When the customer is ready to pay for the order, it collects necessary payment information and sends it to the payment processing system (#4), possibly via the back-end service (#3) as required by the payment processing system (#4). The mobile device application is responsible for exposing any errors or success confirmations to the paying customer. The back-end service works to link the mobile device application (#2), the payment processing system (#4), and the point of sale system (#5) together. It will collect order information from the point of sale system (#5), provide the information to the mobile device application (#2), keep track of items the customer has selected to pay for in the mobile device application (#3), will process payments with the payment processing system (#4) when necessary, and will update the point of sale system (#5) on what items have been paid for. The payment processing system is responsible for processing the customer's payment to the establishment. It will get the information it needs from either the mobile device application (#2) or the back-end service (#3). The point of sale system is where the waitstaff will enter orders. It will provide table location data to the back-end service (#3) so that table locations in the point of sale service can be mapped to and NFC tag, QR code, or Bluetooth device (#1). This mapping will be saved in the back-end system (#3). It will also receive data from the back-end service (#3) after the customer has successfully paid for their items in the mobile device application (#2), and will update itself accordingly. Note that customers can only see order data for the table they are at. Customers cannot claim items from other tales. Customers cannot mark a bill as paid if their payment was not successful.

To make the location-aware, bill-splitting payment system and process of the present disclosure, a person may start by imprinting unique identifiers on NFC tags, QR codes, or Bluetooth devices. They may then write mobile device applications that could retrieve the identifier from the NFC tag, QR code, and/or Bluetooth device. The mobile device application can make requests and handle responses from the back-end service. A back-end service may be built to handle requests from the mobile device applications, make requests to the payment processing system(s), and fetch and update data from the point of sale system(s).

In some embodiments, a separate point of sale system is optionally included. If a second mobile device application was built to be used by the restaurant, order information could go directly into the back-end system rather than the back-end system exchanging data with a separate point of sale system. In some embodiments, a rotating identifier (rather than a static one) is employed by the system to make it more secure if the identifier value is not predictable. In some embodiments, the back-end service could be part of the point of sale system itself. If instead of having a separate point of sale system, there was simply a separate mobile device application that put order information into the back-end system, then no separate point of sale system would be necessary.

To use the location-aware, bill-splitting payment system and process of the present disclosure, an establishment would install the NFC tags, QR codes, and/or Bluetooth devices in their restaurant. The establishment would then register the devices in the back-end service to link them to the tables represented in their point of sale system. The establishment could improve staff efficiency by not requiring them to manually process payments, enabling them to provide better and more focused service to customers. The establishment could increase table turnover rate by not having customer wait for waitstaff to process payments.

A customer would download the mobile device application and use it to quickly and easily pay for their orders while sitting at the table. The customer would reduce the amount of time waiting by paying for their bill without waiting for waitstaff to provide a bill, without having to explain to waitstaff how they want to split the bill, and without waiting for waitstaff to return their payment method to them after the waitstaff is done processing payment.

The location-aware, bill-splitting payment system and process of the present disclosure could be adapted for use to provide payments at medical offices or to provide online payments if a QR code can be displayed on a screen.

The details of the location-aware, bill-splitting payment system and the location-aware, bill-splitting payment process described above are presented for explanatory purposes and other general purposes of illustration, but are not intended to be limiting to just these embodiments. While these embodiments of the location-aware, bill-splitting payment system and the location-aware, bill-splitting payment process have been described with reference to numerous specific details, one of ordinary skill in the art will recognize that the location-aware, bill-splitting payment system and the location-aware, bill-splitting payment process can be embodied in other specific forms without departing from the spirit of the invention. Thus, one of ordinary skill in the art would understand that the location-aware, bill-splitting payment system and the location-aware, bill-splitting payment process is not to be limited by the foregoing illustrative details. As such, several more detailed embodiments of the location-aware, bill-splitting payment system and the location-aware, bill-splitting payment process are described in the sections below. Section I describes a location-aware, bill-splitting payment system and the components of the location-aware, bill-splitting payment system along with a description of a high-level location-aware, bill-splitting payment process. Section II describes several usage scenarios and variations of the location-aware, bill-splitting payment process. Section III describes an electronic system that implements one or more of the system and processes.

I. Location-Aware, Bill-Splitting Payment System

In some embodiments, the location-aware, bill-splitting payment system includes a location-aware digital device that is disposed at a specific order location, a mobile device application that runs on a mobile device of a customer at an establishment, a payment processing system that processes payments for orders, a point of sale (POS) system which receives and tracks customer orders as entered by waitstaff, and a back-end service that manages order ticket status, mobile payments and ties together the payment processing system, the POS system, and the mobile device application. In some embodiments, the location-aware digital device comprises one of an NFC tag, a QR code, and a Bluetooth device. In some embodiments, the Bluetooth device comprises a Bluetooth Low Energy (BLE) device. In some embodiments, the BLE device comprises a beacon that wirelessly transmits a beacon ID via Bluetooth/BLE. In some embodiments, the order location comprises one of a table, a booth, a bar, a counter, and an order station.

By way of example, FIG. 1 conceptually illustrates a high-level block diagram of a location-aware, bill-splitting payment system 100. A usage example is demonstrated in this figure by arrows that represent steps of a process for using the location-aware, bill-splitting payment system 100. Specifically, as shown in this figure, usage of the location-aware, bill-splitting payment system 100 starts with waitstaff putting orders (which, in digital format, is referred to as "customer order data") into a point of sale (POS) system. For example, waitstaff (e.g., a waiter or a waitress) may take food orders from one or more restaurant patrons (customers) and enter the customer orders into the POS system by wirelessly connected handheld mobile device (e.g., smartphone, tablet, customer device, etc.), or by non-mobile computer or terminal station. In other words, the waitstaff either enters the customer orders into a wirelessly connected handheld mobile device contemporaneously with taking verbal orders from the customers or enters the customer orders into a computer or terminal from memory or paper notes after taking the orders from the customers at the table, bar, counter, station, etc.

After the waitstaff enters the customer orders into the POS system, the customer order data is transmitted (at 110) to a back-end location-aware, bill-splitting payment service (also referred to in short form as "back-end service") of the location-aware, bill-splitting payment system 100. Furthermore, the waitstaff may variously enter updated order information when one or more of the customers orders additional items, or changes order information. In such cases, the updated customer order data is transmitted (at 110) from the POS system to the back-end service after entry into the POS system.

The back-end service may be an application service that runs on a host server of the location-aware, bill-splitting payment system 100. The back-end service may be a cloud application service or a back-end service of a private network of the restaurant. In some embodiments, the POS system includes an application module that enables data communication between the POS system and the back-end service. As such, transmission of the customer order data (and updated customer order data, if any) is typically automatic with the back-end service configured to pull customer order data from the POS system and/or the POS system configured to push customer order data to the back-end service.

The back-end service of the location-aware, bill-splitting payment system 100 also associates an NFC tag, a QR code, or a Bluetooth beacon ID with a specific table identifier managed by the POS system, where the specific table identifier managed by the POS system corresponds to a specific table, counter, booth, bar, station, etc. (hereinafter referred to as "table" to avoid obscuring the description with unnecessary detail) at the restaurant or establishment. In some embodiments, the back-end service maps the table identifiers managed by the POS system to the specific tables at the establishment. As such, a customer with a location-aware, bill-splitting payment mobile application (hereinafter referred to as "mobile app") installed on a mobile device can use the mobile app to view order details in near realtime and pay for customer orders in full or in part (splitting payment of a single ticket associated the customer's table). Specifically, when the customer, with his or her mobile device, taps the NFC tag, scans the QR code, or captures the beacon ID (at 112) of the Bluetooth device at the table (hereinafter also referred to simply as "scanning" or "scans" the tag, the code, the or Bluetooth device), the location-aware, bill-splitting payment mobile application (hereinafter referred to as "mobile app") is triggered to start, awaken, or come into foreground focus.

Since the NFC tag, QR code, and Bluetooth device (e.g., beacon) are all location aware, the mobile app will automatically transmit the location data (upon scanning, tapping, or capturing) to the back-end service (at 114, via the arrow pointing from the mobile device application toward the back-end service), which already associates the location to a specific table identifier. The back-end service can then transmit the customer order data (at 114, via the arrow pointing from the back-end service toward the mobile device application), with all of the food and drink orders entered into the POS system by the waitstaff, to the mobile device for viewing or paying by the customer through the mobile app.

While the customer views the customer order data on the mobile device, it is possible that additional food or drink orders are being made by the customer or other customers at the same table as the customer viewing the customer order data via the mobile app. When additional orders are added to the ticket for the table after a customer scans the tag or code at the table, the back-end service of the location-aware, bill-splitting payment system 100 automatically transmits the updated customer order data to the mobile device of the customer. Once received at the mobile device, the mobile app refreshes the customer order data to visually output the additional order items on the screen of the customer's mobile device. Thus, the mobile app is able to display all customer order data of a ticket in near realtime.

The customer can use the mobile app to pay an amount for part or all of the ticket. When paying in part, the customer simply selects the customer order items to pay for, and the mobile app automatically calculates a sub-total of the selected items in realtime (with, in some cases, tax and tip calculated). In some embodiments, sub-totals and selections are maintained locally in the mobile app on the mobile device until the customer selects a mobile app tool (or button) to make a payment for the sub-total amount. In some embodiments, the mobile app allows the customer to provide payment information (e.g., credit card, debit card, etc.) in the mobile app. Then the customer order items selected for payment, the sub-total amount for payment, and the payment information provided by the customer in the mobile app are transmitted (at 114, via the arrow from the mobile device application toward the back-end service) to the back-end service.

In some embodiments, after receiving the customer order items selected for payment, the sub-total amount for which the customer is paying, and the customer-provided payment information, the back-end service transmits (at 116, via the arrow pointing from the back-end service toward the payment system) the sub-total amount and the payment information to the payment system. In some embodiments, the back-end service waits for a payment confirmation or denial from the payment system to determine the next action to take. When the payment system denies payment, the back-end service transmits a "payment denied" notification to the mobile app running on the mobile device of the customer (at 114, via the arrow pointing from the back-end service toward the mobile device application). The customer can then choose another payment method to process payment for the sub-total amount due for the selected items of the food and drink ticket. For example, the customer can select a different credit card or debit card, or the customer can choose a cash payment method, or another method of payment. On the other hand, when the payment system confirms that payment of the sub-total amount is accepted, the back-end service updates the ticket amount due (subtracting the customer's payment of the sub-total amount and possibly the customer's share of the tax and/or tip). The back-end service also updates the food and drink items remaining on the ticket for which payment is due. After updating the ticket amount due and the food and drink items remaining on the ticket, the back-end service transmits (at 118) updated customer order data to the POS system, thereby allowing the POS system to mark the order items selected and paid for by the customer as paid. After the POS system updates the ticket, any remaining customer at the table can continue to order additional food and drink items and render payment for the remaining ticket amount in any manner of their choosing (e.g., via the mobile app if those customers have scanned the tag or code, by cash, by conventional credit card/debit card payment to waitstaff, etc., or any combination of payment methods). Note that customers using the mobile app to provide payment cannot mark a bill for a ticket as paid if their selected payment method was not successful. Additionally, customers using the mobile app after scanning the tag or code at a particular table can only see order data for the particular table at which they made their order with the waitstaff, and only for the current ticket. Also, while customers at the same table can claim and pay for parts or entire amounts of each other customer's ticket amounts, customers neither claim nor pay for items from other tables. For example, three customers can enter a restaurant, be seated at a particular table, make separate and collective food and drink orders, and can all pay for the ticket without the mobile app, or split the bill with some or all of the three customers using the mobile app to bill their respective portions of the bill and/or some of the customers paying for other customers' portions of the bill among the three customers at the same table; but none of the three customers would be able to use the mobile app to claim and pay for items ordered at another table (even when the customers ordering at the other table are relatives or friends). Simply stated, the mobile app will lock to the table at which the customer is making their own order once the customer taps the NFC code, scans the QR code, or receives the Bluetooth device beacon ID and accepts the mobile app running for the table.

The description above provides several high-level details of the components, systems, communication methods, and applications involved in implementations and deployments of the location-aware, bill-splitting payment system 100. The description also details usage steps of a high-level location-aware, bill-splitting payment process. In summary, the steps of the high-level location-aware, bill-splitting payment process include (i) entering orders, by waitstaff, from multiple customers at a particular table into a point of sale (POS) system of an establishment, (ii) receiving new and updated customer order data at a back-end service that ties the POS system and a payment system to a mobile device application used by customers to view and pay for ticket orders, (iii) scanning a tag or code at a table by at least one customer among the multiple customers at the particular table making orders, (iv) selecting particular order items to pay for by the customer among all of the order items on the ticket for the particular table, (v) updating the customer order data of the ticket for the particular table at the back-end service, (vi) providing payment information of the paying customer to the payment system via the back-end service or directly from the paying customer (if the payment system prefers direct payment that is not transmitted by way of the back-end service), (vi) updating ticket payment status and amount due, at the back-end service, upon confirmation of customer's payment by the payment system, and (vii) transmitting, by the back-end service, the updated ticket payment status and amount due to the POS system.

While the sections above provide general details and focus on high-level details of the components, systems, communication methods, and applications involved in implementations and deployments of the location-aware, bill-splitting payment system and the high-level location-aware, bill-splitting payment process, the next section describes several usage scenarios of the location-aware, bill-splitting payment process.

II. Location-Aware, Bill-Splitting Payment Process Examples

Figure 2:
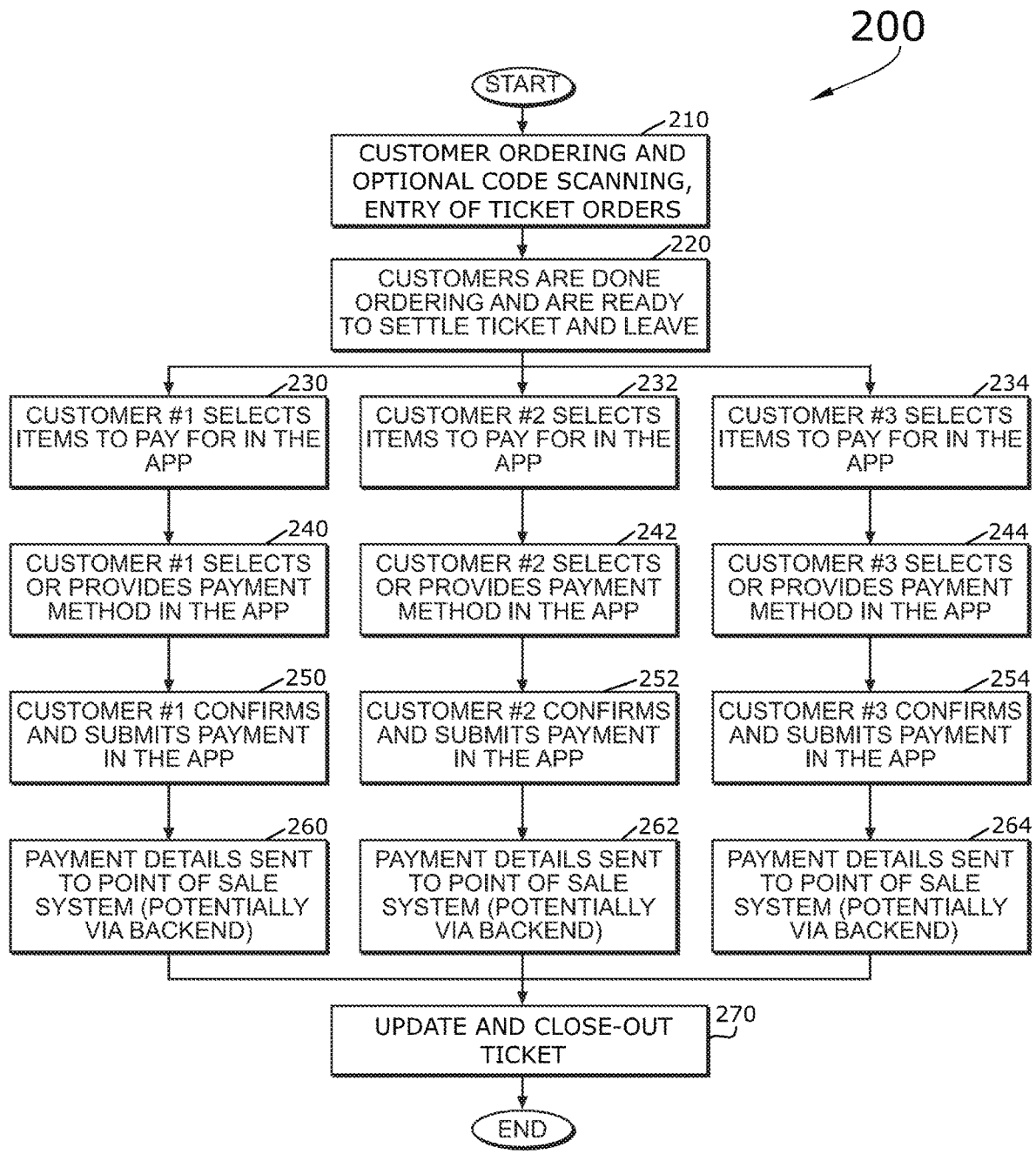
FIG. 2 conceptually illustrates a first example of a location-aware, bill-splitting payment process in some embodiments.

By way of example, FIG. 2 conceptually illustrates a first example of a location-aware, bill-splitting payment process 200 (referred to in this example as "first location-aware, bill-splitting payment process 200"). Descriptions of some of the steps of the first location-aware, bill-splitting payment process 200 are made by reference to FIGS. 3 and 5. As shown in this figure, the first location-aware, bill-splitting payment process 200 starts with a customer ordering (at 210) items at an establishment with optional code/tag scanning, and entry of the ordered items by waitstaff. For example, multiple customers may order food and drink items at a restaurant and the waitstaff taking the food and drink orders will enter those order items into a point of sale (POS) system used by the restaurant.

Figure 3:
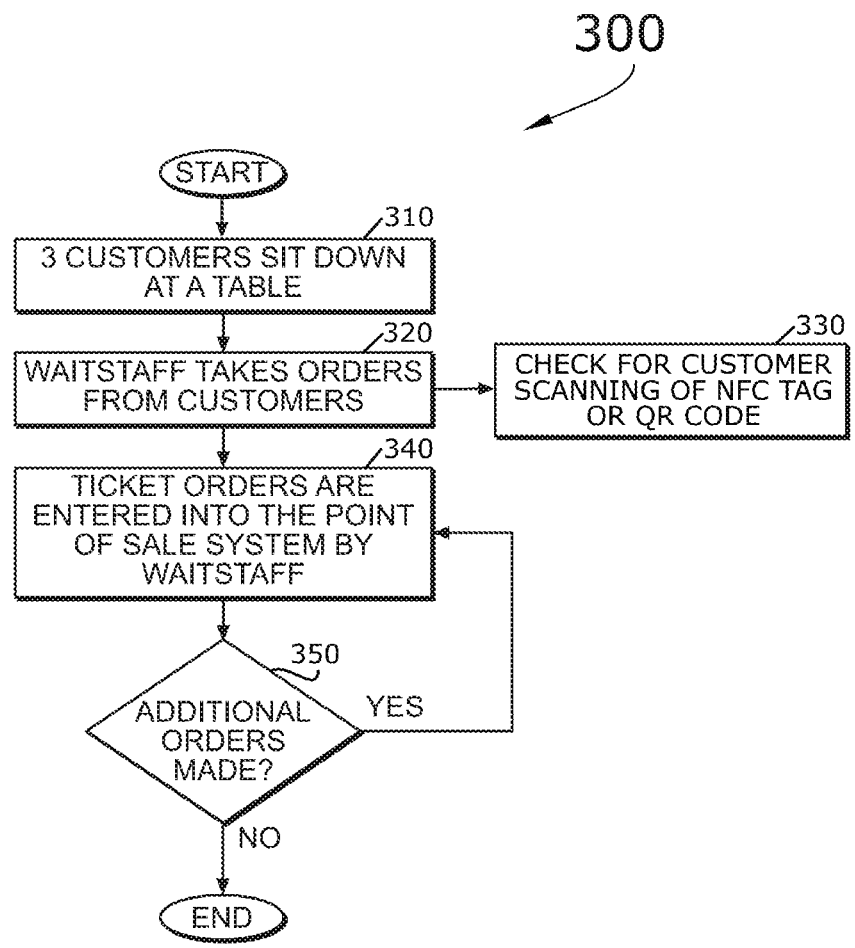
FIG. 3 conceptually illustrates a customer ordering, code scanning, and ticket orders entry process in some embodiments.

Further details of customer ordering/optional code scanning/entry of items by waitstaff (at 210) are described by reference to FIG. 3, which conceptually illustrates a customer ordering, code scanning, and ticket orders entry process 300. Descriptions of at least one step of the customer ordering, code scanning, and ticket orders entry process 300 are made by reference to FIG. 4. Now starting with FIG. 3, the customer ordering, code scanning, and ticket orders entry process 300 provides an example of customer ordering/optional code scanning/entry of items by waitstaff. As shown in this figure, the customer ordering, code scanning, and ticket orders entry process 300 starts with three customers who sit down at a table (at 310) in the restaurant. The customer ordering, code scanning, and ticket orders entry process 300 continues with waitstaff taking orders from the three customers (at 320). For example, each customer orders different food and drink items.

In some embodiments, the customer ordering, code scanning, and ticket orders entry process 300 checks (at 330) for customer tapping of NFC tag or scanning of QR code, or reception of beacon ID from mobile device of one or more of the three customers, when a Bluetooth beacon device is disposed at or near the table at which the three customers sat down. In some embodiments, the customer ordering, code scanning, and ticket orders entry process 300 is implemented as a software module of the back-end service which repeatedly checks (at 330) for customer tapping of NFC tag or scanning of QR code, or reception of beacon ID. In some embodiments, the software module that implements the customer ordering, code scanning, and ticket orders entry process 300 includes a "listener" or "event listener" object that repeatedly checks (at 330) for customer tapping of NFC tag or scanning of QR code, or reception of beacon ID or is triggered to act by an underlying operating system that includes an event handling sub-system.

Figure 4:
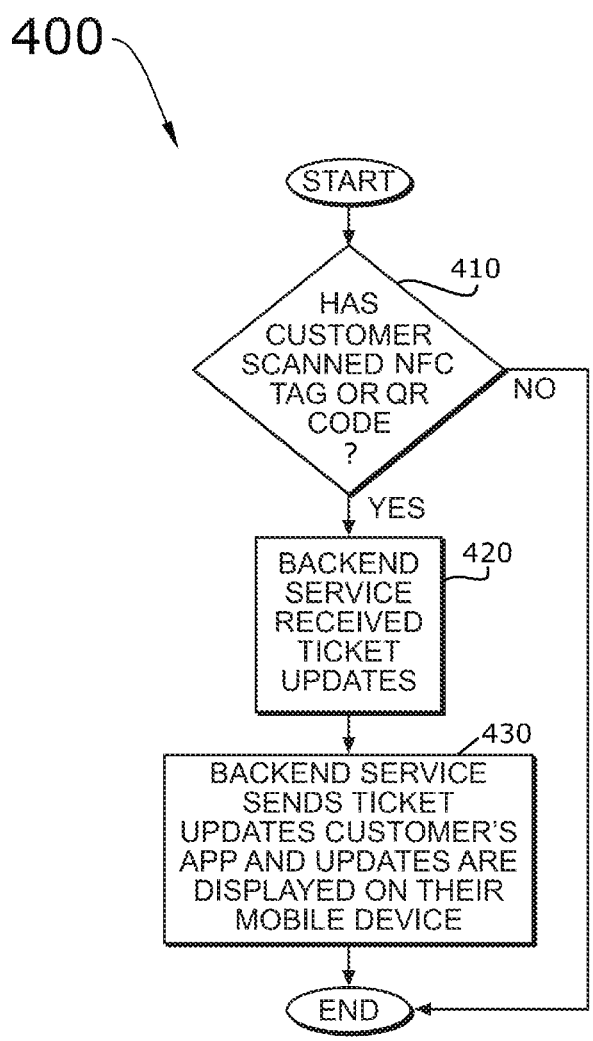
FIG. 4 conceptually illustrates a customer code scanning check process in some embodiments.

Turning now to FIG. 4, a customer code scanning check process 400 is conceptually illustrated. The customer code scanning check process 400 shown in this figure provides an example of several detailed steps that are involved in (or encapsulated within) the single step of checking (at 330) for customer tapping of NFC tag or scanning of QR code (or reception of beacon ID). Specifically, the customer code scanning check process 400 starts by determining (at 410) whether any customer among the three customers at the table have scanned a QR code, tapped an NFC tag, or received a beacon ID from a Bluetooth beacon device at the table. In some embodiments, when a customer taps an NFC tag at a table, the mobile app on the mobile device of the customer is started or awakened, and the NFC tag includes information which directs the mobile app to send a message to the back-end service with a specific table identification. The back-end service then links a unique identifier of the mobile device or session ID of the mobile app to a ticket with customer order data for the table and sends the customer order data (which the back-end service obtains from the POS system) to the mobile device of the customer for display within the mobile app running on the mobile device of the customer.

Thus, when a customer has scanned/tagged, the customer code scanning check process 400 of some embodiments proceeds to the next step at which the back-end service receives all the customer order data for ticket updates at the table (at 420). Then the back-end service sends (at 430) the updated customer order data (i.e., the ticket updates) to the mobile app of the customer, which, once received by the mobile app, are visually output onto a screen of the mobile device of the customer. In this way, the customer who scanned/tagged is able to view all ticket order information in near realtime. After this step (at 430), the customer code scanning check process 400 ends. On the other hand, when none of the customers at the table have scanned/tapped, then the customer code scanning check process 400 does not provide ticket updates or customer order data to any mobile devices of the customers, so the customer code scanning check process 400 ends. However, even after the customer code scanning check process 400 ends, any one or more of the three customers at the table may scan the QR code or tap the NFC code at the table to initiate the customer code scanning check process 400. This is due to the continuing processing of the back-end service and the triggering of the mobile app that occurs when the mobile device of any customer scans QR code or taps NFC tag.

Turning back to FIG. 3, the customer ordering, code scanning, and ticket orders entry process 300 proceeds to the next step at which the ticket orders are entered into the POS system by the waitstaff (at 340). Next, the customer ordering, code scanning, and ticket orders entry process 300 determines (at 350) whether additional orders are made. When additional orders are made, the customer ordering, code scanning, and ticket orders entry process 300 returns to the step at which ticket orders are entered into the POS system by the waitstaff (at 340) are continues forward as before, repeating this cycle until all orders by the three customers are completed. Note that in some cases, customers may make several orders over a span of a dinner or lunch, but may be spaced out in time such that the customer ordering, code scanning, and ticket orders entry process 300 continues to subsequent steps. When there are no more orders made, then the customer ordering, code scanning, and ticket orders entry process 300 ends.

When the customer ordering, code scanning, and ticket orders entry process 300 ends, processing returns back to the first location-aware, bill-splitting payment process 200 described by reference to FIG. 2. Thus, the first location-aware, bill-splitting payment process 200 proceeds to the next step (at 220) during which the three customers are done ordering and are ready to settle payment of the ticket and leave the restaurant.

In this example, the three customers have all tapped the NFC tag, scanned the QR code, or started the mobile app via Bluetooth beacon device (or manually), and are going to split payment of the bill via the mobile app. Accordingly, the first location-aware, bill-splitting payment process 200 continues with three steps (which can be approximately contemporaneous with each other or may be spaced apart in time) at which a first customer of the three customers ("customer #1") selects individual items to pay for in the mobile app (at 230), a second customer of the three customers ("customer #2") selects other individual items to pay for in the mobile app (at 232), and a third customer of the three customers ("customer #3") selects still other individual items to pay for in the mobile app (at 234).

Next, the first location-aware, bill-splitting payment process 200 proceeds for each of the three customers (contemporaneously or separately, as noted above) after their respective individual items have been selected in the mobile app, such that customer #1 selects or provides a payment method (suitable for customer #1) in the mobile app (at 240), customer #2 selects or provides a payment method (suitable for customer #2) in the mobile app (at 242), and customer #3 selects or provides a payment method (suitable for customer #3) in the mobile app (at 244).

In some embodiments, the first location-aware, bill-splitting payment process 200 continues to the next three respective steps for the three customers, during which customer #1 confirms and submits payment for the individual items selected by customer #1 by way of the mobile app (at 250), customer #2 confirms and submits payment for the individual items selected by customer #2 by way of the mobile app (at 252), and customer #3 confirms and submits payment for the individual items selected by customer #3 by way of the mobile app (at 254).

After confirming and submitting payment at the steps for each of the three customers, the first location-aware, bill-splitting payment process 200 proceeds to the next respective steps during which the payment details provided, confirmed, and submitted by customer #1 are sent to the payment processing system (via the back-end service or direct from customer #1 mobile app) and to the POS system via the back-end service (at 260), the payment details provided, confirmed, and submitted by customer #2 are sent to the payment processing system (via the back-end service or direct from customer #2 mobile app) and to the POS system via the back-end service (at 262), and the payment details provided, confirmed, and submitted by customer #3 are sent to the payment processing system (via the back-end service or direct from customer #3 mobile app) and to the POS system via the back-end service (at 264).

In some embodiments, after all of the payments from the three customers have been sent to the POS system, the first location-aware, bill-splitting payment process 200 updates and closes out the ticket (at 270). Then the first location-aware, bill-splitting payment process 200 ends. Several detailed steps are involved in updating and closing out the ticket (at 270) are described next by reference to FIG. 5.

Figure 5:
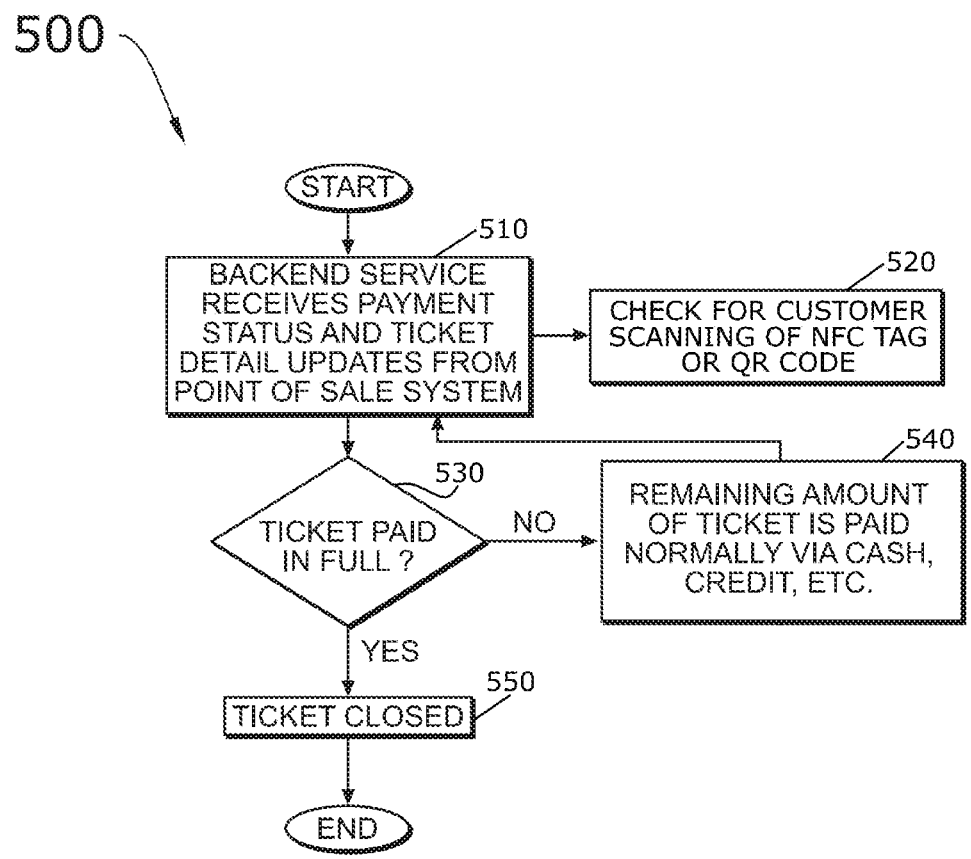
FIG. 5 conceptually illustrates an update and ticket close-out process in some embodiments.

By way of example, FIG. 5 conceptually illustrates an update and ticket close-out process 500. As shown in this figure, the update and ticket close-out process 500 starts when the back-end service receives (at 510) payment status and ticket detail updates (customer order data updates) from the POS system. For example, after an initial ticket with several orders of food and drink items, one or more of the customers may order another item, which the waitstaff would enter into the POS system. Such "late" or "subsequent" orders of items may be added to the ticket regardless of whether another customer has already paid for a portion of the ticket bill. For example, one of the three customers may have completed payment of his or her respective portion of the bill (based on the individual items selected by the customer in the mobile app), while the other two customers remain at the table in the restaurant ordering new items, which are accordingly added to the bill (for example, after the deductions of the paying customer). Additionally, one or more of the three customers may decide to tap that NFC tag or scan the QR code at the table much later into the meal or near the end of the meal when the customer wants to pay his or her portion of the split bill. Thus, the update and ticket close-out process 500 checks (at 520) for customer scanning of QR code or tapping of NFC tag. Details of checking for customer scanning/tapping are described in greater detail above, by reference to FIG. 4.

In some embodiments, after receiving payment status and ticket detail updates from the POS system (at 510) and checking (at 520) for customer scanning/tapping, the update and ticket close-out process 500 determines (at 530) whether the ticket for the table has been paid in full. When the ticket has not been paid in full, then the update and ticket close-out process 500 proceeds to the next step during which the remaining amount or some of the remaining amount of the ticket is paid by a conventional payment method (at 540), such as payment by cash, credit card, debit card, etc., and not by way of the mobile app. Next, the update and ticket close-out process 500 returns to the step at which the back-end service receives the payment status and ticket detail updates from the POS system (at 510), which then proceeds through the steps as noted above. On the other hand, when the update and ticket close-out process 500 determines (at 530) that the ticket is paid in full, then the ticket is closed (at 550) and the update and ticket close-out process 500 ends.

Figure 6:
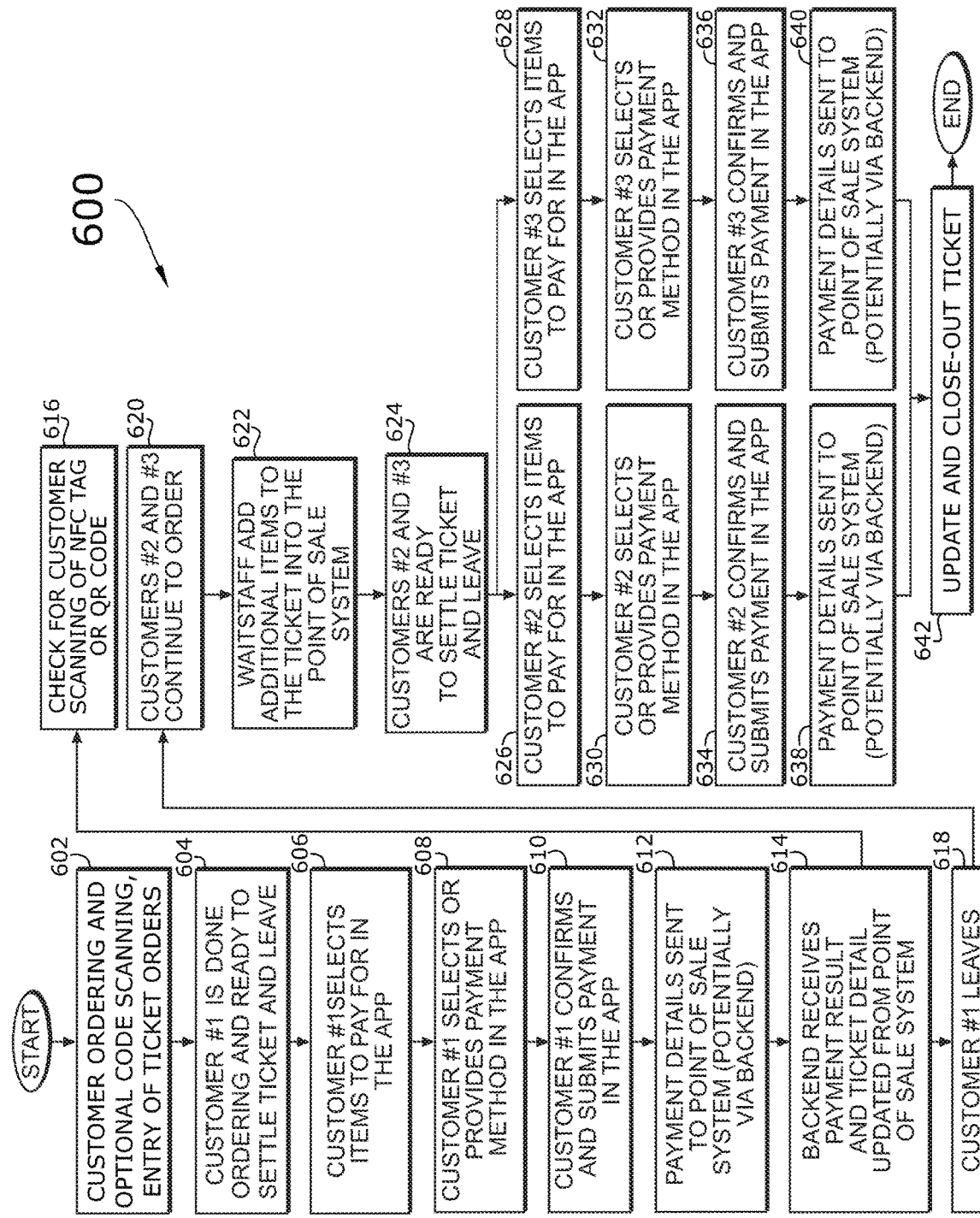
FIG. 6 conceptually illustrates a second example of the location-aware, bill-splitting payment process in some embodiments.

Now, turning to another example, FIG. 6 conceptually illustrates a second example of the location-aware, bill-splitting payment process 600 (referred to in this example as "second location-aware, bill-splitting payment process 600"). The second location-aware, bill-splitting payment process 600 provides another example in which three customers order items at a restaurant, but one of the three customers leaves before the other two customers are finished ordering items to eat and drink during their stay at the restaurant. As shown in this figure, the second location-aware, bill-splitting payment process 600 starts with multiple customers ordering (at 602) items at an establishment with optional code/tag scanning, and entry of the ordered items by waitstaff. Customer ordering/optional code scanning/entry of items by waitstaff (at 602) is described in greater detail above by reference to FIG. 3.

In some embodiments, the second location-aware, bill-splitting payment process 600 continues to the next step in which customer #1 is done ordering and is ready to settle his or her portion of the ticket and leave the restaurant (at 604). Next, customer #1 selects the individual items to pay for in the mobile app (at 606) and then selects or provides a payment method in the mobile app (at 608) to pay his or her portion of the bill. After selecting items and a method of payment, customer #1 then confirms and submits payment in the mobile app (at 610).

In some embodiments, the second location-aware, bill-splitting payment process 600 continues with payment details being sent (at 612) to the POS system, followed by the back-end service receiving (at 614) the payment result and ticket details updated from the POS system. In some embodiments, the second location-aware, bill-splitting payment process 600 moves on to the step for checking (at 616) for customer scanning of QR code or tapping of NFC tag. Details of checking for customer scanning/tapping are described in greater detail above, by reference to FIG. 4.

Contemporaneously with checking (at 616) for customer scanning/tapping, customer #1 may leave the restaurant (at 618) while customer #2 and customer #3 continue to order items (at 620) while seated at the table in the restaurant. As customer #2 and customer #3 continue to order, the waitstaff adds the additional items to the ticket by entering them into the POS system (at 622). Eventually, customer #2 and customer #3 are ready to settle the ticket and leave the restaurant (at 624).

In some embodiments, the second location-aware, bill-splitting payment process 600 proceeds along two approximately contemporaneous sequences of steps during which customer #2 selects items in the mobile app to pay for by way of the mobile app (at 626) and customer #3 similarly selects items to pay for in the mobile app (at 628). After selecting items to pay for in the mobile app, the second location-aware, bill-splitting payment process 600 continues to the next step at which customer #2 selects or provides a payment method in the mobile app (at 630) and customer #3 similarly selects or provides a payment method in the mobile app (at 632). Next, customer #2 confirms and submits payment in the mobile app (at 634) while customer #3 confirms and submits payment in the mobile app (at 636). After confirming and submitting payment in the mobile app, the payment details for customer #2 are sent to the POS system (at 638) and, likewise, the payment details for customer #3 are sent to the POS system (at 640). Finally, the second location-aware, bill-splitting payment process 600 updates and closes out the ticket (at 642). A detailed example of updating and closing out a ticket is described above in the relation to the update and ticket close-out process 500, by reference to FIG. 5.

Figure 7:
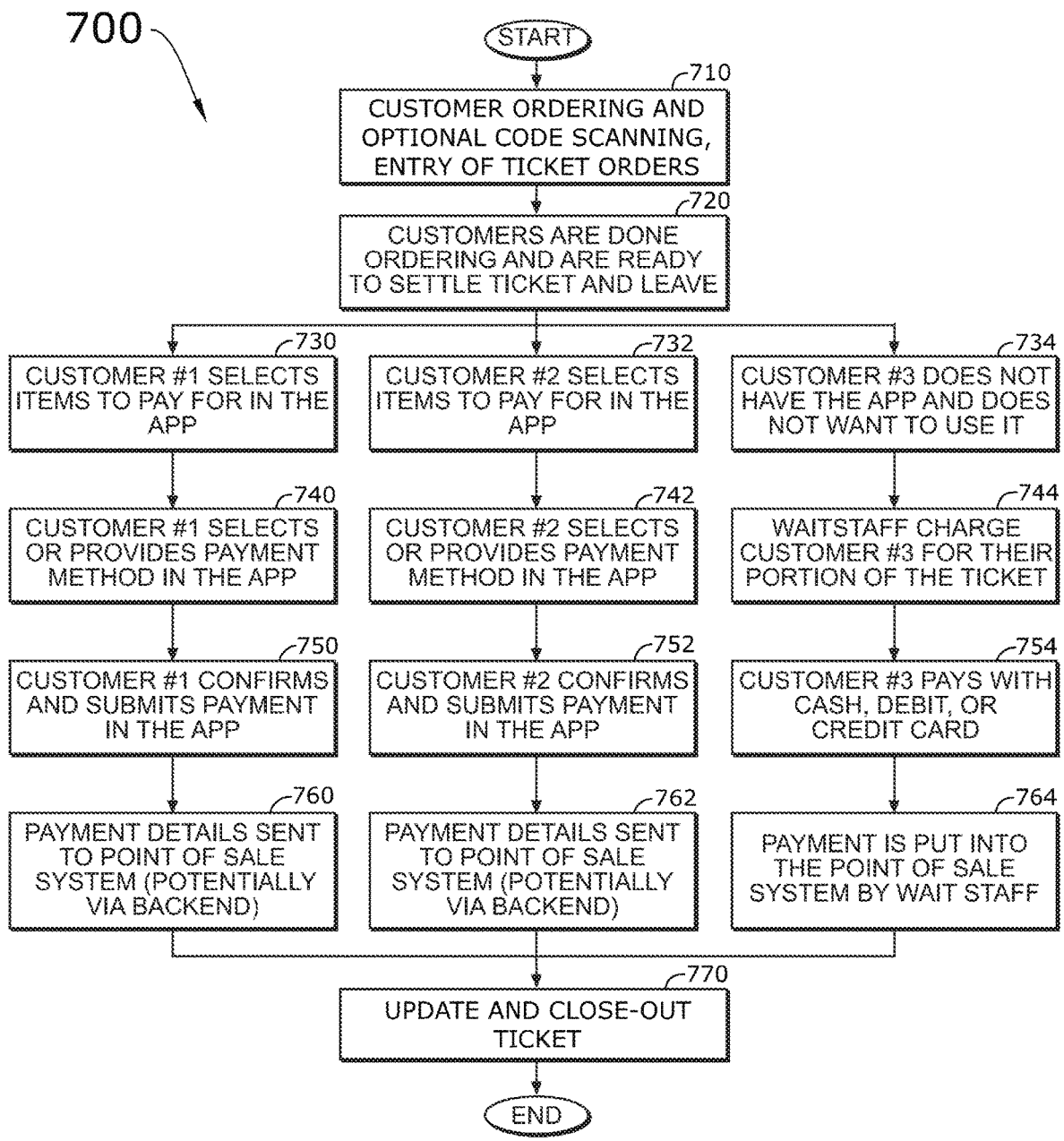
FIG. 7 conceptually illustrates a third example of the location-aware, bill-splitting payment process in some embodiments.

By way of example, FIG. 7 conceptually illustrates a third example of the location-aware, bill-splitting payment process 700 (referred to in this example as "third location-aware, bill-splitting payment process 700"). As shown in this figure, the third location-aware, bill-splitting payment process 700 involves three customers who order items, with two of the customers pay for their portions of a split bill by way of the mobile app and the third customer not wanting to use the mobile app, and therefore, paying by a conventional payment method.

In some embodiments, the third location-aware, bill-splitting payment process 700 starts by the three customers ordering (at 710) items at an establishment with optional code/tag scanning, and entry of the ordered items by waitstaff. Further details of customer ordering/optional code scanning/entry of items by waitstaff (at 710) are described above by reference to FIG. 3. Next, the third location-aware, bill-splitting payment process 700 proceeds forward to the following step (at 720) during which the three customers are done ordering and are ready to settle payment of the ticket and leave the restaurant.

In some embodiments, the third location-aware, bill-splitting payment process 700 continues along the three separate and approximately contemporaneous sequence of steps during which two customers pay by mobile app and one of the customers pay by another, conventional payment method. Specifically, these three separate sequences of steps of the third location-aware, bill-splitting payment process 700 include customer #1 selecting items to pay for in the mobile app (at 730), customer #2 selecting items to pay for in the mobile app (at 732), and customer #3 not using the mobile app to select items (at 734) because customer #3 either does not have the mobile app or does not want to use the mobile app at this time.

After selecting items to pay for in the mobile app, the third location-aware, bill-splitting payment process 700 continues to the next step at which customer #1 selects or provides payment method details in the mobile app (at 740), customer #2 selects or provides payment method details in the mobile app (at 742), but customer #3 does not use the mobile app (at 742), so the waitstaff charges customer #3 for their portion of the ticket (at 744). Next, customer #1 confirms and submits payment in the mobile app (at 750) and customer #2 confirms and submits payment in the mobile app (at 752), while customer #3 pays by his or her preferred payment method (at 754), such as by cash, debit card, or credit card (as handed to the waitstaff).

After payment is made by each of the three customers, the third location-aware, bill-splitting payment process 700 continues to the next steps during which payment details provided, confirmed, and submitted by customer #1 are sent to the POS system (at 760), payment details provided, confirmed, and submitted by customer #2 are sent to the POS system (at 762), and the conventional payment provided by customer #3 is entered into the POS system by the waitstaff (at 764).

In some embodiments, after the payments made by mobile app from customer #1 and customer #2 have been sent to the POS system, and the conventional payment from customer #3 has been entered into the POS system by the waitstaff, the third location-aware, bill-splitting payment process 700 updates and closes out the ticket (at 770). As noted above, detailed steps of updating and closing out the ticket (at 770) are described by reference to FIG. 5. Then the third location-aware, bill-splitting payment process 700 ends.

In some embodiments, the location-aware, bill-splitting payment process and the location-aware, bill-splitting payment system handles scenarios in which a customer provides a payment method via the mobile app and the payment method includes a pre-authorized amount with which to pay part of or an entirety of the remaining bill after the pre-authorizing customer pays for their portion via mobile app and leaves the establishment.

Figure 8:
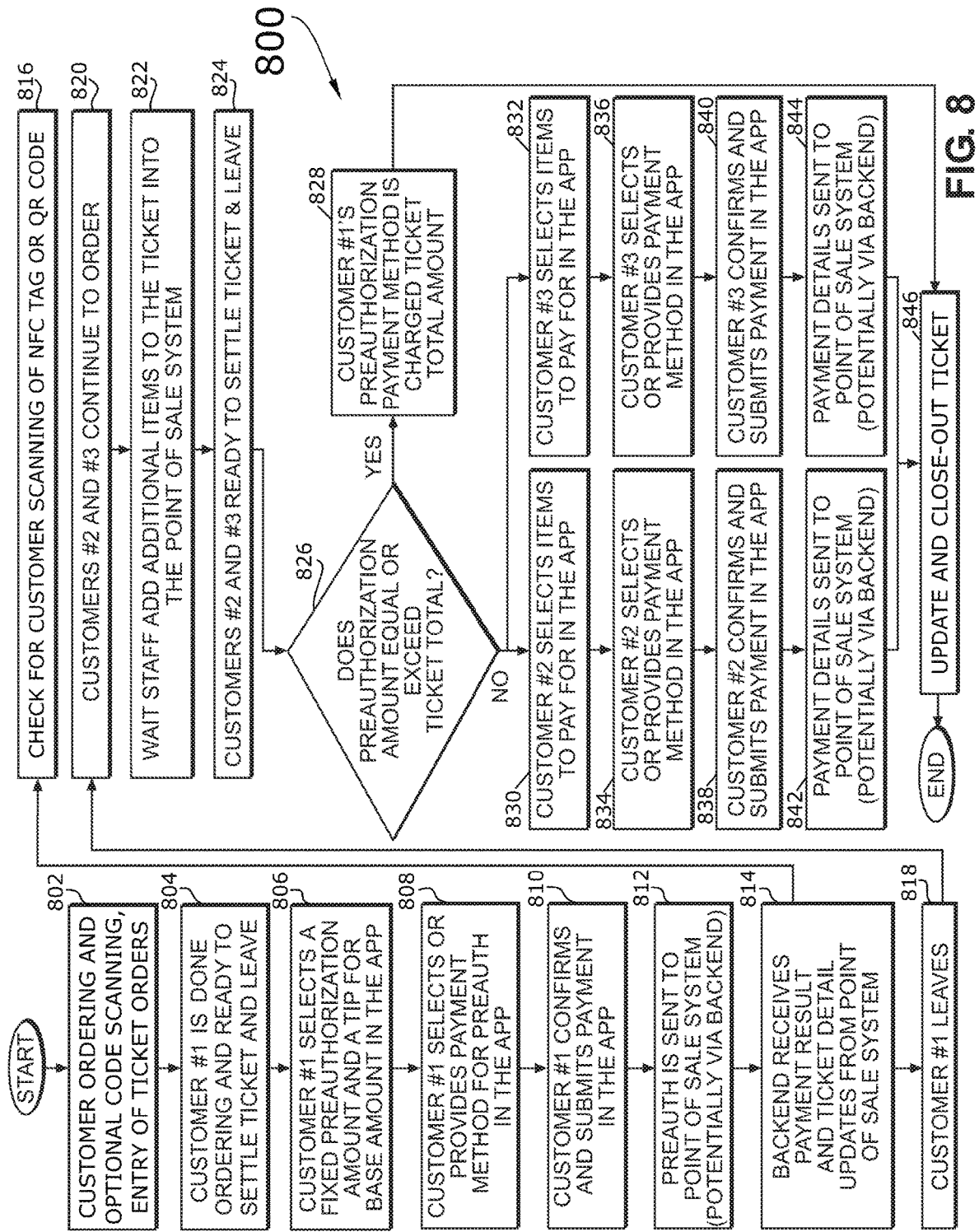
FIG. 8 conceptually illustrates a fourth example of the location-aware, bill-splitting payment process for providing a fixed pre-authorized amount for payment in some embodiments.

By way of example, FIG. 8 conceptually illustrates a fourth example of the location-aware, bill-splitting payment process 800 for providing a fixed pre-authorized amount for payment (referred to in this example as "fourth location-aware, bill-splitting payment process 800"). As shown in this figure, the fourth location-aware, bill-splitting payment process 800 starts with multiple customers ordering (at 802) items at an establishment with optional code/tag scanning, and entry of the ordered items by waitstaff. Customer ordering/optional code scanning/entry of items by waitstaff (at 802) is described in greater detail above by reference to FIG. 3.

In some embodiments, the fourth location-aware, bill-splitting payment process 800 continues to the next step in which customer #1 is done ordering and is ready to settle his or her portion of the ticket and leave the establishment (at 804). Next, customer #1 selects a fixed pre-authorization amount and a tip for a base amount in the mobile app (at 806). For example, customer #1 may be a manager of a sales team and decides to pre-authorize an amount that is covered for three professionals employed by a particular corporation, or customer #1 may be indebted to one or both of the other customers for a certain amount covered by the fixed pre-authorization amount.

After selecting the fixed pre-authorization amount (and tip for the base amount) via the mobile app, the fourth location-aware, bill-splitting payment process 800 continues with customer #1 selecting or providing a payment method for the fixed pre-authorized amount and base tip via the mobile app (at 808). Next, customer #1 confirms and submits payment in the mobile app (at 810), after which, the pre-authorized amount is sent to the POS system (at 812) and the back-end service receives (at 814) the payment result (e.g, accepted/denied) and ticket detail updates (customer order updates) from the POS system. In some embodiments, the fourth location-aware, bill-splitting payment process 800 moves on to the step for checking (at 816) for customer scanning of QR code or tapping of NFC tag (or receiving beacon ID data packets). Details of checking for customer scanning/tapping are described in greater detail above, by reference to FIG. 4.

Contemporaneously with checking (at 816) for customer scanning/tapping, customer #1 may leave the restaurant (at 818) while customer #2 and customer #3 continue to order items (at 820) as they are seated at the table in the restaurant. As customer #2 and customer #3 continue to order, the waitstaff adds the additional items to the ticket by entering them into the POS system (at 822). Eventually, customer #2 and customer #3 are ready to settle the ticket and leave the restaurant (at 824).

In some embodiments, the fourth location-aware, bill-splitting payment process 800 determines (at 826) whether the pre-authorized amount equals or exceeds the ticket total. When the pre-authorized amount equals or exceeds the ticket total, then the payment method selected/provided by customer #1 for the pre-authorized amount is charged the remaining amount on the ticket (at 828). In some embodiments, the fourth location-aware, bill-splitting payment process 800 then updates and closes-out the ticket (at 846) and the fourth location-aware, bill-splitting payment process 800 ends.

On the other hand, when the pre-authorized amount is determined (at 826) to be less than the ticket total, then the fourth location-aware, bill-splitting payment process 800 proceeds along two sequences of approximately contemporaneous steps for each of the remaining customers in order to complete payment of the ticket total and close-out the ticket. Specifically, the remaining customers select their respective individual items to pay for, with customer #2 selecting his or her items to pay for in the mobile app (at 830) and customer #3 selecting his or her respective order items in the mobile app to pay for (at 832). This is followed by payment method selection during which customer #2 selecting or providing a payment method in the mobile app (at 834) and customer #3 selecting or providing a payment method in the mobile app. After selecting and providing their respective payment methods to pay for their respective order items (as selected), the next step of the fourth location-aware, bill-splitting payment process 800 continues with customer #2 confirming and submitting payment in the mobile app (at 838) and customer #3 confirming and submitting payment in the mobile app (at 840). Payment details are then sent to the POS system for customer #2 (at 842) and customer #3 (at 844).

In some embodiments, after payment details for customer #2 and customer #3 have been sent to the POS system, the fourth location-aware, bill-splitting payment process 800 (which provides steps for handling pre-authorized amounts from one or more of the customers) updates and closes out the ticket (at 846). As before, detailed steps of updating and closing out the ticket (at 846) are described above by reference to FIG. 5. Then the fourth location-aware, bill-splitting payment process 800 ends. Thus, this example demonstrates the flexibility of payment methods for the location-aware, bill-splitting payment system and location-aware, bill-splitting payment process when customer split bills and at least one customer intends to cover a fixed pre-authorized amount of the final ticket bill, but leaves before the ticket is closed.

Figure 9:
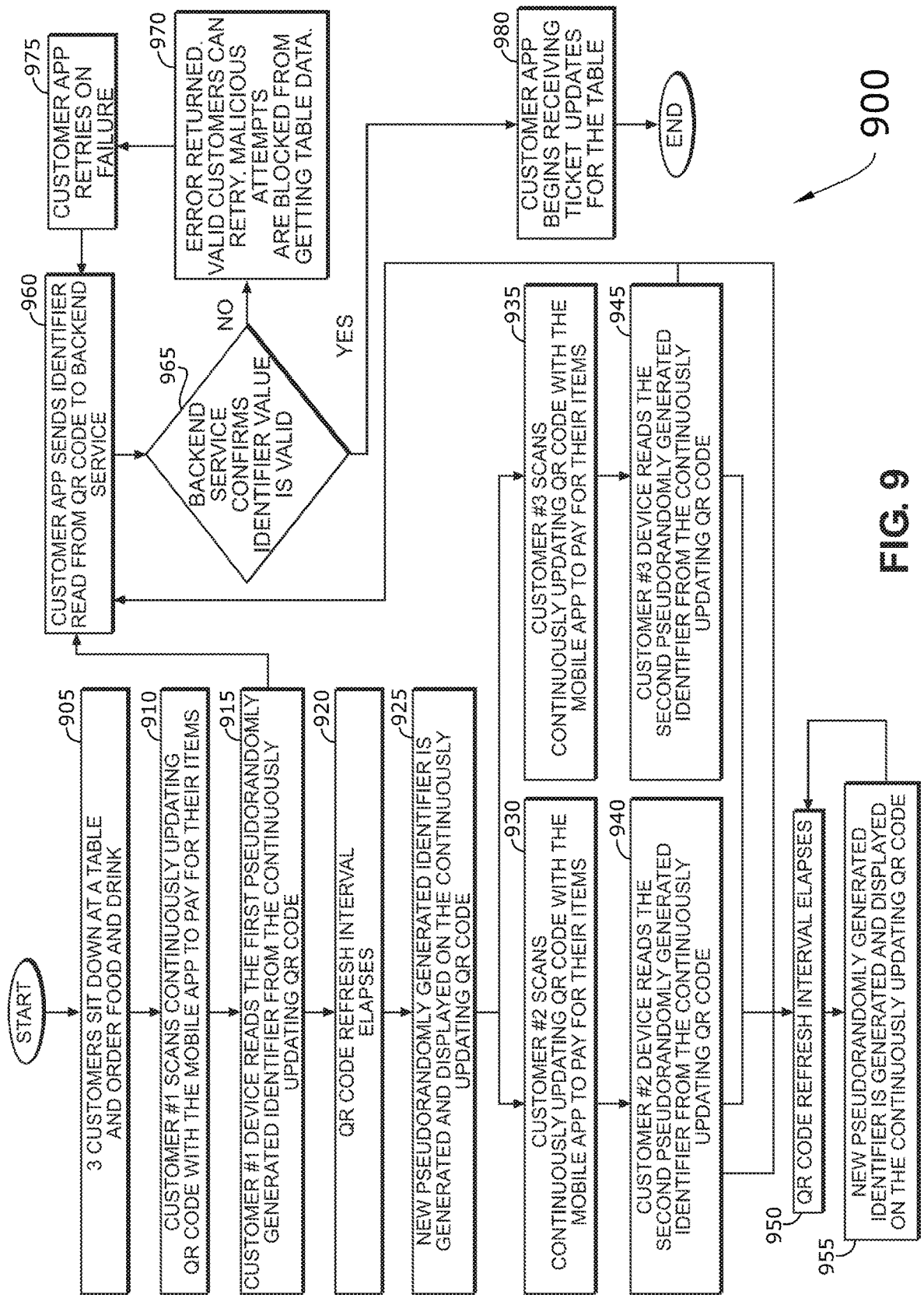
FIG. 9 conceptually illustrates a fifth example of the location-aware, bill-splitting payment process with continuously changing QR code in some embodiments.

A variation of the embodiments of the location-aware, bill-splitting payment system and the location-aware, bill-splitting payment process described above by reference to FIGS. 1-8 is described next, by reference to FIG. 9. Specifically, FIG. 9 conceptually illustrates a fifth example of the location-aware, bill-splitting payment process 900 (referred to in this example as "fifth location-aware, bill-splitting payment process 900") in which a QR code is a continually updated QR code, rather than a static QR code. As shown in this figure, the fifth location-aware, bill-splitting payment process 900 starts with multiple customers (e.g., three customers in this example) sitting down at a table and ordering food and drink items (at 905) at an establishment. Next, customer #1 uses his or her mobile device (with the mobile app installed) to scan a continuously updating QR code at or near the table (at 910). In this case, customer #1 is using the mobile app to scan the QR code in order to view and pay for individual items of a shared ticket with orders from all three customers. The difference from the earlier examples is that the QR code in this example is continuously changing. In some embodiments, a continuously changing QR code is advantageous to an establishment as it increases transaction security by effectively preventing man-in-the-middle attacks (i.e., those intercepted data transmissions in which the QR code may be already known to a perpetrator or hacker who redirects information in a way unintended by the customer or the establishment). In some embodiments, the continuously changing QR code is possible by a process that provides pseudo-randomly generated identifier values via reading of the continuously changing/updating QR codes by a mobile device of a customer.

Thus, in some embodiments, the fifth location-aware, bill-splitting payment process 900 continues with the mobile device of customer #1 reading a first pseudo-randomly generated identifier from the continuously changing or updating QR code (at 915). In some embodiments, the fifth location-aware, bill-splitting payment process 900 continues with the mobile app for customer #1 sending the first pseudo-randomly generated identifier to the back-end service (at 960). Details of the steps that follow are described further below.

Sometime after customer #1 scans the continuously changing QR code and after the mobile device of customer #1 reads the first pseudo-randomly generated identifier from the changing QR code, the QR code refresh interval elapses (at 920) causing a new, second pseudo-randomly generated identifier to be generated (at 925) and displayed on the continuously changing/updating QR code.

In some embodiments, the fifth location-aware, bill-splitting payment process 900 continues along two separate but approximately contemporaneous sequences of steps during which customer #2 and customer #3 scan the QR code. Specifically, customer #2 scans the continuously changing/updating QR code with the mobile app on the mobile device in order to select and pay for his or her respective individual items (at 930) while customer #3 similarly scans the continuously changing/updating QR code with the mobile app on the mobile device of customer #3 in order to select and pay for customer #3's respective individual items (at 935). Next, the mobile device of customer #2 reads the second pseudo-randomly generated identifier from the continuously changing/updating QR code (at 940) and, likewise, the mobile device of customer #3 reads the second pseudo-randomly generated identifier from the continuously changing/updating QR code (at 945). In another example, the time between customer #1 scanning the QR code and customer #2 scanning the QR code may be similar to the time between scanning of the QR code by customer #2 and customer #3, resulting in (perhaps) a third pseudo-randomly generated identifier from the continuously changing/updating QR code as read by the mobile device of customer #3. This is demonstrated by the fifth location-aware, bill-splitting payment process 900 at step 950 and step 955, during which the scan time another refresh interval elapses, causing the third pseudo-randomly generated identifier to be generated. Nevertheless, for this example, customers #2 and #3 have a different pseudo-randomly generated identifier than customer #1.

In some embodiments, the fifth location-aware, bill-splitting payment process 900 continues with customer #2 and customer #3 using the mobile app to send the second pseudo-randomly generated identifier to the back-end service (at 960). Note that the back-end service has now received two different identifiers: the first pseudo-randomly generated identifier from the mobile app of customer #1 and the second pseudo-randomly generated identifier from the mobile app of customers #2 and #3. Yet all three customers have ordered items in a common ticket and all three customers (in this example) wish to view and pay for their respective individual items using the mobile app in connection with the back-end service.

In some embodiments, the fifth location-aware, bill-splitting payment process 900 then determines (at 965), for each of the three customers, whether the back-end service confirms that the identifier value sent by the mobile app of the customer is valid. When the back-end service confirms validity of the identifier value for the customer, than the fifth location-aware, bill-splitting payment process 900 continues with receiving ticket updates (at 980) for the table in the mobile app running on the mobile device of the customer. Then the fifth location-aware, bill-splitting payment process 900 ends.

On the other hand, when the back-end service does not confirm validity of the identifier value for the customer, than the fifth location-aware, bill-splitting payment process 900 continues with returning an error value (at 970). In such case, the customer who receives the error can retry to scan the continuously changing/updating QR code. Malicious attempts from hackers, bots, perpetrators, etc., are blocked from obtaining any customer order data associated with the table at which the three customers made their orders. After returning the error value (or error code), the fifth location-aware, bill-splitting payment process 900 continues with the mobile app retrying after the failure (at 975) followed by sending the pseudo-randomly generated identifier from the mobile app to the back-end service again. The pseudo-randomly generated identifier from the mobile app on retry may be the same pseudo-randomly generated identifier from the mobile app if the refresh interval has not elapsed since the prior scan, or the pseudo-randomly generated identifier from the mobile app can be updated/changed again after the refresh interval has lapsed. Eventually, when the back-end service can confirm validity of the pseudo-randomly generated identifier from the mobile app (at 965), then the mobile app of that customer will be updated to show updated customer order data for the customer's table (at 980). Then the fifth location-aware, bill-splitting payment process 900 ends.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
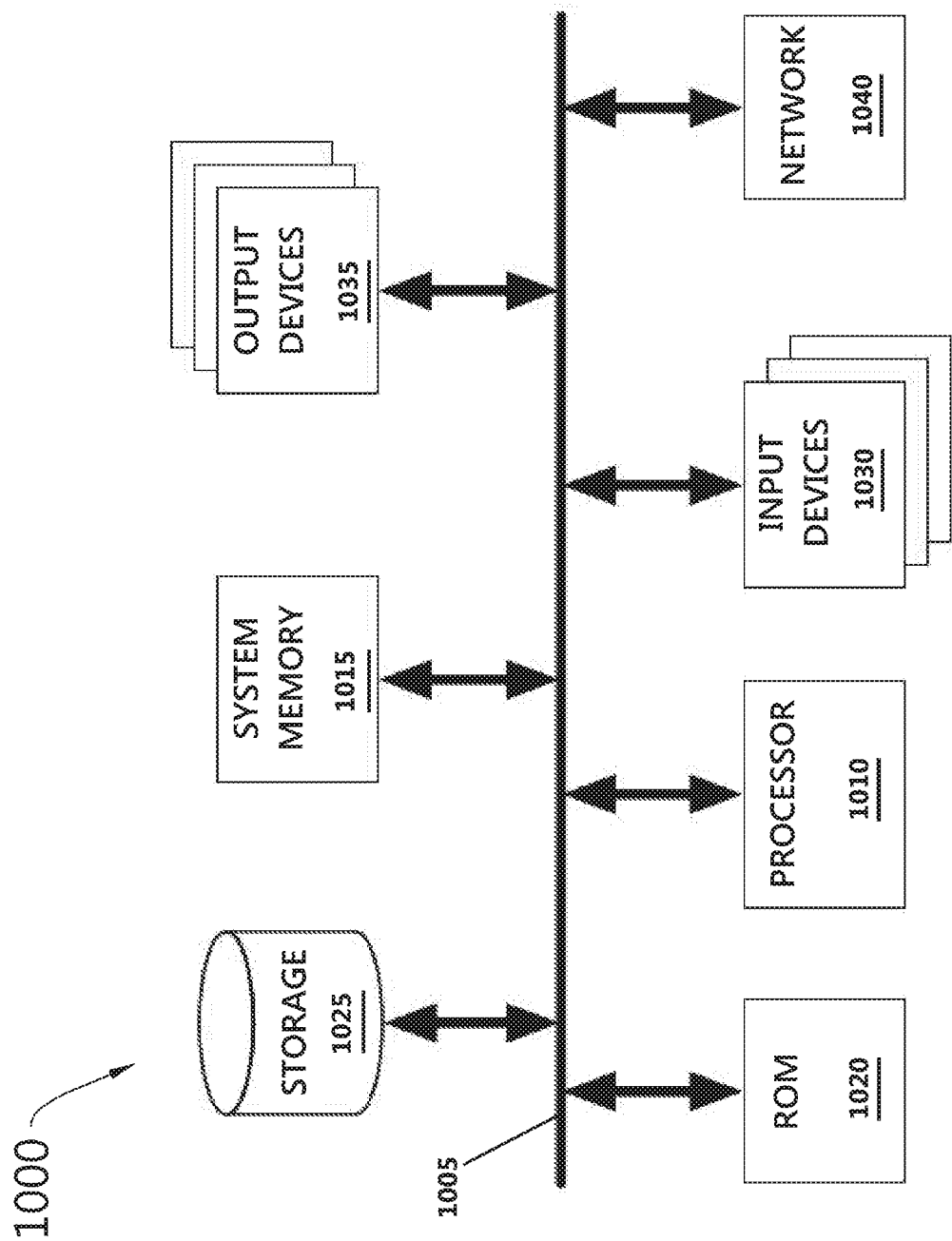
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer, mobile device, tablet, phone, smartphone, or any other sort of electronic device. Such an electronic system includes various types of computer readable media and interfaces for various other types of computer readable media. Electronic system 1000 includes a bus 1005, processing unit(s) 1010, a system memory 1015, a read-only 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only 1020, the system memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk or a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only 1020. For example, the various memory units include instructions for processing appearance alterations of displayable characters in accordance with some embodiments. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as cathode ray tubes (CRT) or liquid crystal displays (LCD). Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the drawings conceptually illustrate processes, each with multiple steps. In each case, the specific operations of a process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A location-aware, bill-splitting, payment system comprising:

a table identification element that is positioned proximate to a specific table in a restaurant and is readable by mobile devices of customers in a party of multiple customers at the specific table to capture a unique identifier that corresponds to the specific table in the restaurant, wherein, when the table identification element is read by a mobile device, the unique identifier is captured by the mobile device and a restaurant ticket settlement option is provided to the mobile device for a particular customer in the party of multiple customers who is associated with the mobile device to pay for particular food and drink items the particular customer ordered from the restaurant at the specific table;

a back-end service for managing mobile application state information and food and drink order data associated with the particular food and drink items the particular customer ordered from the restaurant at the specific table and other food and drink items the party of multiple customers ordered from the restaurant at the specific table;

a point of sale (POS) system that manages tables at the restaurant in the back-end service by tracking food and drink orders and successfully paid sales transactions associated with the tracked food and drink orders, wherein the particular food and drink items ordered by the particular customer and the other food and drink items ordered by the party of multiple customers at the specific table are entered into the POS system by wait staff wherein the POS system comprises an application module that provides data communication for food and drink order data to and from the back-end service;

a mobile application that runs on the mobile device of the particular customer and on a second mobile device of a second customer in the party of multiple customers served food and drink items at the specific table as ordered from the restaurant by the party of multiple customers, wherein the mobile application running on the mobile device captures the unique identifier when the table identification element is read by the mobile device and the mobile application running on the second mobile device captures the unique identifier when the table identification element is read by the second mobile device, wherein the particular customer interacts with the mobile application to select the particular food and drink items the particular customer ordered from the restaurant at the specific table, pay an amount due for the selected particular food and drink items and add a tip to the amount due, enter a payment method to cover the amount due and the tip, and confirm payment of the amount due and the tip for the selected particular food and drink items; and a payment processing system that receives the amount due and the tip from the back-end-service and receives the payment method from the particular mobile device of the particular customer as entered into the mobile application running on the particular mobile device after the particular customer confirms payment of the amount due and the tip for the selected particular food and drink items, wherein the payment processing systems sends a confirmation of successful payment when payment of the amount due and the tip is successfully processed as a paid sales transaction, wherein the payment processing system is separate from the POS system, wherein the payment processing system is linked to the POS system and the mobile application by the back-end service, and wherein the back-end service, when linking the payment processing system, the POS system, and the mobile application together, is configured to (i) collect order information about the particular food and drink items ordered by the particular customer and the other food and drink items ordered by the party of multiple customers at the specific table by way of the application module of the POS system after the order information is entered by the waitstaff into the POS system, (ii) provide the collected order information to the mobile application running on both the mobile device of the particular customer and the second mobile device of the second customer in the party of multiple customers at the specific table, (iii) detect when the table identification element is re-read by a particular mobile device comprising one of the mobile device of the particular customer and the second mobile device of second customer, (iv) retrieve updated order information from the POS system by way of the application module when at least one additional food and drink item is ordered by anyone in the party of multiple customers at the specific table before the table identification element is re-read by the particular mobile device, (v) provide the updated order information to the mobile application running on the particular mobile device when it is detected that the table identification element has been re-read by the particular mobile device, (vi) detect when a transaction for payment of at least one food and drink item in the order information and the updated order information is initiated by the mobile application running on the particular mobile device, (vii) detect when the transaction for the payment of the at least one food and drink item is completed by the payment processing system, and (viii) notify the POS system to update the amount due based on the completed transaction for payment of the at least one food and drink item.

2. The location-aware, bill-splitting, payment system of claim 1, wherein the second customer interacts with the mobile application on the second mobile device to select, from the other food and drink items the party of multiple customers ordered from the restaurant at the specific table, second food and drink items ordered by the second customer from the restaurant at the specific table, pay a second amount due for the selected second food and drink items and add a second tip to the second amount due, enter a second payment method to cover the second amount due and the second tip, and confirm payment of the second amount due and the second tip for the selected second food and drink items.

3. The location-aware, bill-splitting, payment system of claim 2, wherein the particular customer pays the amount due and the tip for the selected particular food and drink items by the payment method as entered into the mobile application running on the particular mobile device before the second customer pays the second amount due and the second tip for the selected second food and drink items by the second payment method as entered into the mobile application running on the second mobile device.

4. The location-aware, bill-splitting, payment system of claim 3, wherein the second food and drink items selected by the second customer include at least one extra food and drink item that the second customer ordered from the restaurant after the particular customer pays the amount due and the tip for the selected particular food and drink items, wherein the at least one extra food and drink item that the second customer ordered is managed by the back-end service as mobile application state information in connection with the other food and drink items the party of multiple customers ordered from the restaurant at the specific table.

5. The location-aware, bill-splitting, payment system of claim 2, wherein a third customer interacts with the mobile application on a third mobile device to select, from the other food and drink items the party of multiple customers ordered from the restaurant at the specific table, third food and drink items ordered by the third customer from the restaurant at the specific table, pay a third amount due for the selected third food and drink items and add a third tip to the third amount due, enter a third payment method to cover the third amount due and the third tip, and confirm payment of the third amount due and the third tip for the selected third food and drink items.

6. The location-aware, bill-splitting, payment system of claim 2, wherein a third customer interacts with restaurant staff to select, from the other food and drink items the party of multiple customers ordered from the restaurant at the specific table, third food and drink items ordered by the third customer from the restaurant at the specific table, obtain a notification from the restaurant staff of a third amount due for the selected third food and drink items, provide a third payment method to cover the third amount due and a third tip, and provide payment of the third amount due and the third tip for the selected third food and drink items, wherein the third customer provides payment by one of (i) a cash payment for the third amount due and the third tip, (ii) a credit card payment for the third amount due and the third tip, and (iii) a debit card payment for the third amount due and the third tip.

7. The location-aware, bill-splitting, payment system of claim 1, wherein the table identification element comprises an NFC tag.

8. The location-aware, bill-splitting, payment system of claim 1 comprising a plurality of table identification elements, wherein the table identification element is a first table identification element in the plurality of table identification elements.

9. The location-aware, bill-splitting, payment system of claim 8, wherein the first table identification element comprises a OR code, wherein the plurality of table identification elements comprises a second table identification element that is one of an NFC tag and a Bluetooth beacon.

10. The location-aware, bill-splitting, payment system of claim 1, wherein the table identification element comprises a OR code.

11. The location-aware, bill-splitting, payment system of claim 10, wherein the OR code comprises a continuously updated OR code.

12. The location-aware, bill-splitting, payment system of claim 11, wherein the continuously updated OR code pseudo-randomly generates a new identifier value to display as the continuously changing OR code after a refresh period elapses.

13. The location-aware, bill-splitting, payment system of claim 1, wherein the table identification element comprises a Bluetooth beacon.

\* \* \* \* \*